No. 817,523. PATENTED APR. 10, 1906.
S. C. SCOTT & J. C. WATSON.
WATER DISTRIBUTER FOR SICKLES.
APPLICATION FILED SEPT. 5, 1905.
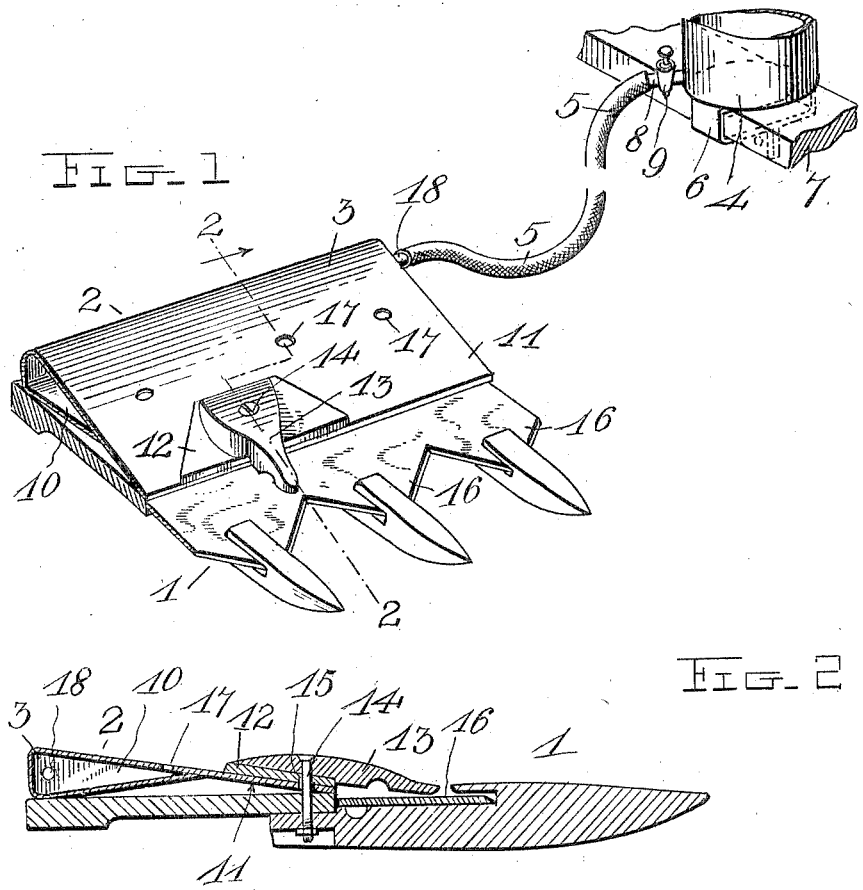
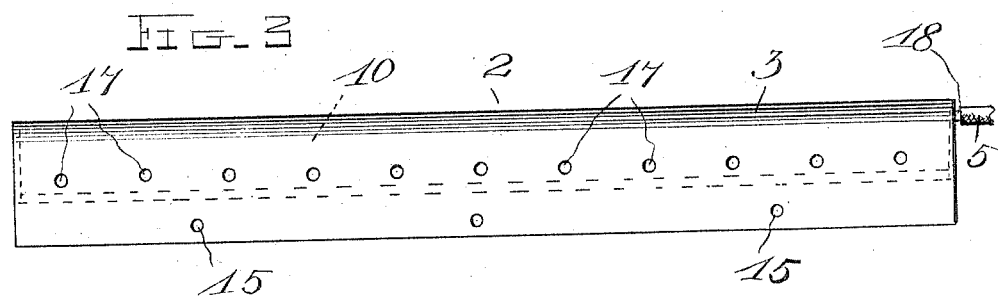
Witnesses
Inventors
S. C. Scott
J. C. Watson
by H. B. Wilson
Attorney.

UNITED STATES PATENT OFFICE.

SIDNEY C. SCOTT AND JOHN C. WATSON, OF MARION, KANSAS.

WATER-DISTRIBUTER FOR SICKLES.

No. 817,523. Specification of Letters Patent. Patented April 10, 1906.

Application filed September 5, 1905. Serial No. 277,051.

*To all whom it may concern:*

Be it known that we, SIDNEY C. SCOTT and JOHN C. WATSON, citizens of the United States, residing at Marion, in the county of Marion and State of Kansas, have invented certain new and useful Improvements in Water-Distributers for Sickles; and we do declare the following to be a full, clear, and exact description of the invention, such as will enable others skilled in the art to which it appertains to make and use the same.

Our invention relates to improvements in devices for watering the sickle or cutter bars of harvesting and mowing machines to prevent the gum of alfalfa, grass, and the like from collecting upon them and impeding or stopping their motion.

The object of the invention is to provide a simple and comparatively inexpensive device of this character by means of which water may be distributed over the sickle or cutter bar and its teeth, so that gum will be effectively prevented from collecting and interfering with the reciprocation of the same.

With the above and other objects in view the invention consists of certain novel features of construction, combination, and arrangement of parts, as will be hereinafter described and claimed.

In the accompanying drawings, Figure 1 is a perspective view showing a portion of a mowing-machine with our improved watering device applied thereto. Fig. 2 is a transverse sectional view, on an enlarged scale, taken on the plane indicated by the line 2 2 in Fig. 1; and Fig. 3 is a top plan view of the device removed from the sickle-bar.

Referring to the drawings by numeral, 1 denotes a portion of a mowing-machine of any well-known or preferred form and construction, and 2 denotes our improved watering device, which consists of a distributer-head 3, a water reservoir or tank, and a connecting pipe or hose 5. The tank 4 may be of any suitable form and construction and may be mounted at any suitable point upon the machine; but we preferably clamp the same, as shown at 6, upon the tongue or draft-pole 7. The part 5 is preferably formed of a flexible tube or hose which has one of its ends engaged with a discharge connection 8, which is provided adjacent to the bottom of the tank 4 and contains a cut-off valve 9, by means of which the passage of the liquid through the tube 5 may be regulated. The distributer-head 3 is preferably formed, as shown, from a single piece of sheet metal by bending the same over upon itself to form a longitudinally-extending substantially wedge-shaped chamber 10 and an attaching-flange 11. This head is secured, as clearly shown in Fig. 2 of the drawings, between the wear-plate 12 and the sickle-holder 13 by means of bolts 14, which are passed through openings 15 in the attaching-flange 11. These bolts 14 have their heads countersunk in the sickle-holder 13, and their nuts are countersunk in the bottom of the guard, as shown. Owing to the provision of the chamber 10, the upper face of the head 3 will be inclined downwardly and forwardly, so that the water from said chamber will run down the same and drop upon the sickles or cutters 16. The water is discharged from said chamber 10 through small apertures 17, which are arranged in its upper face, as shown in Fig. 3 of the drawings, and water is admitted into said chamber through a connection 18, provided at one end of the head 3 and engaged by one end of the tube or hose 5.

The construction, operation, and advantages of the invention will be readily understood from the foregoing description, taken in connection with the accompanying drawings.

It will be seen that by means of the device water may be supplied from time to time to the sickles or cutters or may be supplied continuously thereto by regulating the valve 9, so that any formation of gum upon the sickles and their guards will be prevented.

Various changes in the form, proportion, and the minor details of construction may be resorted to without departing from the principle or sacrificing any of the advantages of this invention.

Having thus described our invention, what we claim as new, and desire to secure by Letters Patent, is—

In combination with the cutting apparatus of a harvester or mower, the herein-described distributer-head bearing on the finger-bar and comprising the chamber, wedge-shaped in transverse section, having the inclined upper side formed with a forwardly-extending flange to bear on the finger-bar and provided with bolt-openings, the upper side of the chamber being provided with openings for the discharge of water.

In testimony whereof we have hereunto set our hands in presence of two subscribing witnesses.

SIDNEY C. SCOTT.
JOHN C. WATSON

Witnesses:
ANGIE B. MANSFIELD,
J. E. GOOD.